July 29, 1952  J. K. BOUGHTON  2,605,195
METHOD AND APPARATUS FOR BUILDING TIRES
Filed Oct. 29, 1949

Inventor
James K. Boughton
By
R. L. Miller
ATTORNEY

Patented July 29, 1952

2,605,195

UNITED STATES PATENT OFFICE 2,605,195

METHOD AND APPARATUS FOR BUILDING TIRES

James K. Boughton, Akron, Ohio, assignor to Wingfoot Corporation, Akron, Ohio, a corporation of Delaware Application October 29, 1949, Serial No. 124,413

18 Claims. (Cl. 154—9)

The present invention relates to a tire building apparatus and to a method of building tires and in the present form of the invention it is exemplified as being appiled to the building of a bicycle tire although its application is not necessarily limited to such tires.

One object of this invention is to provide a simple and efficient means for turning the edges of a fabric band over the beads of the tire and against the portion of the band intermediate the beads.

A further object of this invention is to provide fluid means for lifting the edges of a fabric band off the surface of a building drum to which it has been applied and turning said edges over the tire beads which have been placed on the band in the steps of forming the carcass of the tire.

Other objects of this invention will appear hereinafter as the description thereof proceeds, the novel features, arrangements and combinations being clearly set forth in the specification and in the claims thereunto appended.

In general, it has heretofore been the practice to turn the fabric over the beads manually or by means of mechanical devices. In the manufacture of bicycle tires particularly, it has been the practice to employ manual means for turning the edges of the band over the beads. It has not been too practical to use mechanical devices for this operation although such have been employed heretofore. The present invention seeks to effect the turning of the edges by a very effective and rapid means which has very little tendency to damage the fabric, as sometimes happens with mechanical devices.

The principal feature of the invention is to turn the edges of the fabric over by means of a blast of air directed against the edge of the fabric to lift the fabric from the building drum and then progressively turn it over the bead until it lies over the portion of the band intermediate the beads while at the same time snugly embracing the beads.

Figure 2:
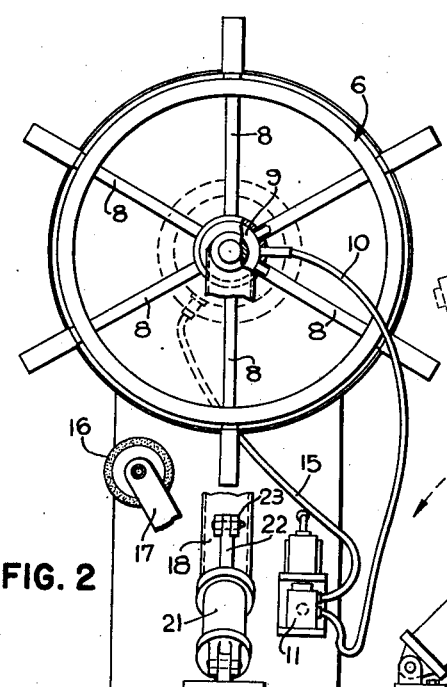
Fig. 2 is an elevation of the left side of the apparatus shown in Fig. 1.
Figure 1:
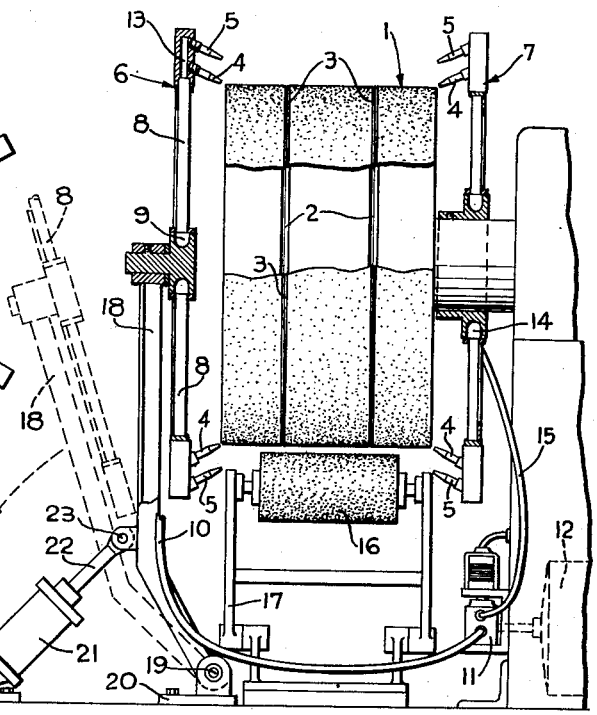
Fig. 1 is a front elevation of an apparatus illustrating the invention more or less schematically.

In Figs. 1 and 2, I have shown an apparatus which comprises essentially a building drum 1 rotatably mounted on a support in the usual manner and this is provided with two grooves 2 in the periphery thereof. Over the surface of the drum is placed a fabric band used to form the carcass of the tire and bead wires 3 are wrapped about this band just above the grooves 2. These bead wires 3 force the fabric down into the grooves as best illustrated in Figs. 3, 4, 5 and 6. It is now necessary to turn the fabric between the beads and the outer edges of the drum over the beads and against the portion of the band intermediate the grooves 2. By having the beads in the grooves, it is easier to move the fabric into overlapping relation in the manner to be described.

There is provided at each end of the drum two series of nozzles 4 and 5, each adjacent pair acting as a unit in the manner to be described later. These nozzles are mounted on wheel-shaped frames 6 and 7 at different radial distances from the axis of the drum. The wheel 6 has spokes 8 which are hollow and communicate wtih a central, annular chamber 9 at the hub which in turn is connected by a tube 10 to a valve 11 which controls the supply of air from the pressure tank 12 or other source of pressure. The outer ends of the spokes 8 are formed with hollow chamber 13 which communicate with the nozzles 4 and 5 so that air introduced under pressure into the channel 9 of the hub through the tube 10 is directed outwardly through the spokes 8, chambers 13 and nozzles 4 and 5.

The wheel 7 is constructed similar to the wheel 6 and the annular chamber 14 in the hub is connected by a tube 15 to the valve 11 which regulates the pressure from the pressure tank 12 containing air at a pressure of approximately 100#/sq. inch. While no means is shown for actuating the valve 11, it is understood that any suitable means can be employed to either manually or automatically connect the source of pressure 12 with the tubes 10 and 15, thereby simultaneously directing blasts of air through the nozzles 4 and 5 and for simultaneously or successively operating the flow of air from the tank 12 to each set of nozzles at opposite ends of the drum. By rotating the drum 1 the air blasts directed by the nozzles 4 and 5 will be progressively applied to all portions of the fabric adjacent the edges thereof, starting at six different points about the periphery at each end of the drum. The result is that the fabric is very quickly turned over the beads and against the portion of the band intermediate the beads and in a manner which will be described more fully in connection with Figs. 3 to 6, inclusive.

A stitcher roll 16 mounted beneath the drum on a rocking support 17 is used to stitch the layers of fabric together after the layers have been superimposed one upon the other by the blasts of air. There is nothing new in this particular step of the process as such methods have been employed in tire building for a great many years.

The wheel-shaped frame 6 is mounted on the end of an arm 18 pivoted at 19 to a bracket 20 secured to the floor and this is moved from the full line position to the dotted line position shown in Fig. 1 by means of a fluid cylinder 21 which has a piston rod 22 connected to the arm 18 at 23. When the arm 18 is moved to the dotted line position the tire may be removed from the end of the drum.

Figure 3:
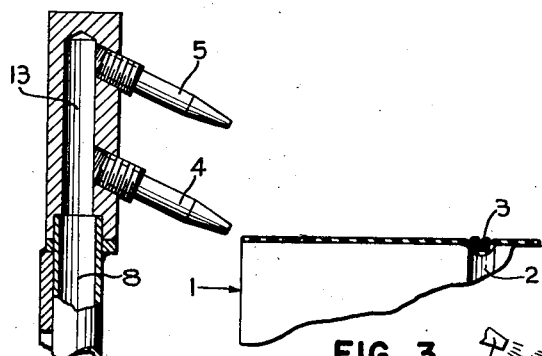
Figs. 3, 4, 5 and 6 are enlarged fragmentary views showing the action of the fluid jets against the edges of the fabric at successive times.
Figure 4:
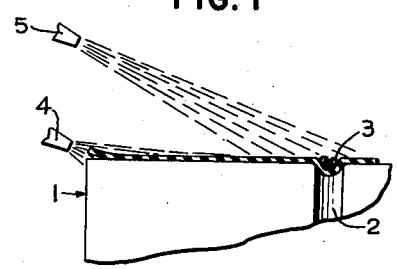
Figure 5:
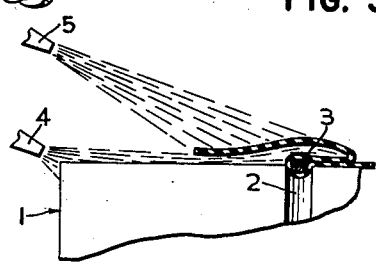
Figure 6:
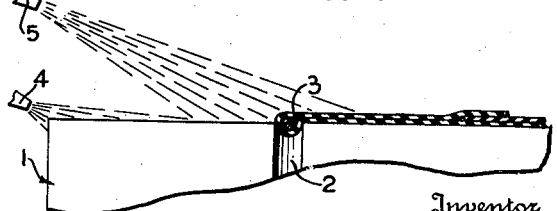

Referring now particularly to Figs. 3, 4, 5 and 6, Fig. 3 represents the position of the fabric after the beads have been applied thereto and before the turning operation is begun. Figs. 4, 5 and 6 illustrate the successive positions of the fabric during the turning operation although these are merely illustrative and, actually, in the turning operation the fabric may protrude farther from the drum than shown in the intermediate position (Fig. 5). Fig. 5 merely shows that the fabric is turned in such a way that it is doubled upon itself and progressively moved over the central portion of the band without actually being lifted very far from the band.

It will be noted in Fig. 3, as in the other figures, that the blasts of air from the nozzles 4 are directed adjacent the edge of the fabric so as to lift the fabric off the drum as in Fig. 4 and, when completely lifted off the drum, a cushion of air is provided which permits free movement of the fabric over the drum, the force of the air causing a progressive movement of the fabric over the bead as in Fig. 5 until it reaches its final position as shown in Fig. 6. The blasts from the nozzles 5 hold the fabric fairly close to the drum and in the final stages are directed under the fabric to move the fabric into its final position (Fig. 6).

Since the drum is rotated, the action is a progressive action starting at six different points around the circumference and the result is that the band is first lifted off the drum at six different points and the progressive lifting of the fabric during the rotation of the drum will enable the entire operation to take place in approximately one-sixth (⅙) of a complete rotation of the drum. The entire operation after the drum is started and the blasts of air turned on requires only a fraction of a second.

Since the other operations of applying the band to the beads are the same as previously employed in the work of this character, it is obvious that the saving in time is considerable over the manual operation for doing this and that it has certain advantages over any mechanical means in view of the fact that the air blast does little, if any, damage to the fabric. If a mechanical means were provided for doing this operation, it would require various guides, gears and drives which would only complicate the operation and would certainly slow it down. In the method described, the operator merely presses a button to release the pressure to the nozzles and at the same time cause a rotation of the drum whereby in a very short time both edges of the fabric are brought over the central area of the band. If the fabric ends are to overlap each other in their final positions, as is usually the case, the timing is such that air is supplied first to one set of nozzles at one end and then to the other set. Fig. 6 shows the edges overlapping, that at the right being positioned first. This timing of the air supply and the synchronizing of the air blasts can be done by relays or other means well understood in the art.

While certain representative embodiments and details have been shown for the purpose of illustrating the invention, it will be apparent to those skilled in this art that various changes and modifications may be made therein without departing from the spirit or scope of the invention.

Having thus fully described my invention, what I claim and desire to secure by Letters Patent of the United States is:

1. The method of building tires on a drum which comprises the steps of applying a band to said drum, applying a bead over said fabric spaced from the edge of said band, and applying a fluid blast between the edge of the band and the drum to turn the band over said bead and against the band at the opposite side of the bead.

2. The method of building tires set forth in claim 1 in which the blast is localized at at least one position adjacent the edge of the fabric and in which the drum is rotated relative to the blast to progressively turn the fabric over the bead.

3. The method of building tires set forth in claim 1 in which the blast is localized at at least three peripherally spaced positions adjacent the edge of the fabric and in which the drum is rotated relative to the blast to progressively turn the fabric over the bead.

4. The method of building tires on a drum which comprises the steps of applying a band to said drum, applying a pair of beads over said band, each spaced from each other and from the adjacent edges of the band, and applying a fluid blast between the edges of the band and drum to turn said edges over the adjacent beads and against the band intermediate said beads.

5. The method of building tires according to claim 1 in which the fluid blast is directed downwardly against the drum adjacent the edge of the band and at an angle with respect to the surface of the drum over which the band lies.

6. The method of building tires according to claim 1 in which the fluid blast is directed downwardly against the drum adjacent the edge of the band and at an angle with respect to the surface of the drum over which the band lies and substantially in a plane passing through the axis of rotation of said drum.

7. The method of building tires which comprises the steps of applying a tire band to a drum, applying at least one bead over said fabric spaced from one edge thereof, and applying separate blasts of fluid to said edge of said fabric, one of said blasts being directed against the edge of said fabric to raise the edge free of the drum and turn it progressively into overlapping relation with the band, beginning with that portion lying closest to the bead and the other being directed against the band inwardly of said edge near the bead to hold the fabric close to the drum and to assist the first blast in moving the fabric over the bead when the edge is moved close to the bead.

8. A method as set forth in claim 7 in which another bead is positioned on said band near the opposite edge and the said opposite edge of the band is acted upon simultaneously by two similarly directed blasts of fluid, whereby the edges are simultaneously folded over the beads against the portion of the band intermediate said beads.

9. A method as set forth in claim 7 in which another bead is positioned on said band near the opposite edge and the said opposite edge of the band is acted upon successively by two similarly directed blasts of fluid, whereby the edges are successively folded over the beads against the portion of the band intermediate said beads.

10. The method set forth in claim 7 in which the drum is rotated relative to said fluid blasts to progressively turn the fabric about the bead.

11. The method set forth in claim 7 in which the drum is rotated relative to said fluid blasts and in which additional blasts of air similarly directed against the band are provided at peripherally spaced points about the drum.

12. Tire building apparatus in which there is a tire building drum on which a tire band is formed and beads are applied to the outer surface thereof, the combination with said drum of at least one nozzle adjacent the edge of the drum for directing a blast of air against the drum adjacent the position to be occupied by the edge of the band for turning the edge over said bead, and means for forcing air through said nozzle.

13. Tire building apparatus according to claim 12 in which a series of similarly constructed nozzles are arranged at spaced positions peripherally of said drum.

14. Tire building apparatus according to claim 12 in which there is an additional similarly constructed nozzle positioned to direct a blast of fluid against the drum inwardly of the edge thereof and adjacent the bead position when the band and bead are in operative position on said drum.

15. Tire building apparatus in which a building drum has a bead receiving recess over which a band is first placed and a bead then laid over the band to project the adjacent portion of said band into said recess, the combination with said drum of a frame mounted at the end of said drum, a peripherally arranged series of nozzles carried by said frame and mounted to direct a blast of air toward the surface of the drum for turning the edge of the fabric over the bead, and means for forcing air through said nozzles.

16. A tire building apparatus comprising a building drum having a bead receiving recess over which a band is first placed and the bead then laid over the band to project the adjacent portions of the band into said recess, the combination with said drum of a frame mounted at the end of said drum, at least two peripheral series of nozzles mounted on said frames to direct a stream of air toward the surface of the drum at an angle to the surface thereof for turning the edge of the fabric over the beads, and means for forcing air through said nozzles, the nozzles of one series being mounted to direct a blast of air adjacent the drum at a position near the edge of the fabric and the nozzles of another series being mounted to direct blasts of air toward said drum at a position near said bead.

17. A tire building apparatus as set forth in claim 16 in which the nozzles of one series are arranged in substantially the same radial plane through the axis of the drum as corresponding nozzles of the other series whereby there are pairs of nozzles arranged substantially at the same peripheral positions about the drum.

18. A device as set forth in claim 15 in which the frame is mounted for movement away from the drum to a position permitting removal of the completed band from the drum.

JAMES K. BOUGHTON.

REFERENCES CITED

The following references are of record in the file of this patent:

UNITED STATES PATENTS

| Number | Name | Date |
| --- | --- | --- |
| 1,908,823 | Daniell | May 16, 1933 |
| 1,921,579 | Otto | Aug. 8, 1933 |
| 2,394,318 | McChesney | Feb. 5, 1946 |
| 2,445,728 | Stevens | July 20, 1948 |
| 2,487,196 | Sternad et al. | Nov. 8, 1949 |
| 2,488,340 | Shook et al. | Nov. 15, 1949 |